United States Patent
Panelli et al.

(10) Patent No.: US 7,702,655 B1
(45) Date of Patent: Apr. 20, 2010

(54) MAINTAINING AND USING USER-CREATED MAPPING HISTORY FOR NETWORK RESOURCE MAPPING

(75) Inventors: John D. Panelli, Campbell, CA (US); Sesh Jalagam, Santa Clara, CA (US); Alan Kin Chung Leung, Fremont, CA (US)

(73) Assignee: EMC Corporation, Hopkinton, MA (US)

( * ) Notice: Subject to any disclaimer, the term of this patent is extended or adjusted under 35 U.S.C. 154(b) by 325 days.

(21) Appl. No.: 11/668,932

(22) Filed: Jan. 30, 2007

(51) Int. Cl.
*G06F 17/30* (2006.01)

(52) U.S. Cl. .................. 707/104.1; 707/1; 707/100; 709/223; 709/224

(58) Field of Classification Search .............. 707/1, 707/10, 100, 104.1, 102, 200, 201; 709/220, 709/223, 224
See application file for complete search history.

(56) References Cited

U.S. PATENT DOCUMENTS

| 7,296,131 | B2 * | 11/2007 | Mimatsu et al. | 711/170 |
| 7,328,260 | B1 * | 2/2008 | Muthiyan et al. | 709/224 |
| 2003/0149753 | A1 * | 8/2003 | Lamb | 709/223 |
| 2006/0080465 | A1 * | 4/2006 | Conzola et al. | 709/245 |

* cited by examiner

*Primary Examiner*—Tim T. Vo
*Assistant Examiner*—Dangelino N Gortayo
(74) *Attorney, Agent, or Firm*—Chapin IP Law, LLC

(57) ABSTRACT

A system provides a user map service that receives component data associated with a resource in a storage area network and matches the component data to entries in a user-created component matching database to determine a specific identity of the resource in the storage area network to which the component data is associated. The system provides the specific identity of the resource in the storage area network to which the component data is associated. The system maintains the user-created component matching database by allowing a user to create matches between individual resources for which component data is received to specific identities of those resources as determined by the user. The database can be queried and updated to make matching more efficient.

15 Claims, 6 Drawing Sheets

MAINTAINING AND USING USER-CREATED MAPPING HISTORY FOR NETWORK RESOURCE MAPPING

BACKGROUND

The rapid expansion of information service and data processing industries has resulted in a need for computer systems to manage and store large amounts of data. As an example, financial service industry organizations such as banks, mutual fund companies or the like often operate large and complex data processing systems that require access to many hundreds of gigabytes or even terabytes of data. Computer system developers have responded to these types of data storage and information sharing requirements by creating large complex networks that store data. An example of a network that stores data is referred to as a storage area network or SAN. A typical SAN is a collection of data storage systems that are networked with a number of host computer systems that operate as servers to access data stored in the data storage systems. Other types of networks include wide are networks such as the Internet and local area network such as smaller corporate networks.

Using a SAN as an example network, elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or manager of such a network environment may install one or more distributed network management software applications within host computers in the network to manage or administer the various resources (i.e., devices, host computer systems, storage systems, applications, etc.) that operate within the network. A network manager (i.e., a person) responsible for management of the network operates the network management software application(s) to perform management tasks such as performance monitoring, network analysis and remote configuration and administration of the various components (i.e., software and hardware resources) operating within the network.

A conventional network management software application may have several different software components that execute independently of each other on different computer systems but that collectively interoperate together to perform network management. As an example, conventional designs of storage area network management software applications can include a management station programs such as console and server processes, several agent processes that operate on remote host computers, store process and possibly other software processes.

Generally, the server process operates as a central control process within the storage area network management application and coordinates communication between the console, storage and agent processes. The console process often executes within a dedicated network management workstation to allow a network administrator to visualize and remotely control and manage the various elements within the storage area network that are graphically represented on an interface presented by the console. The console allows the administrator to, for example, issue a command to an agent operating on a host computer within the network being managed. Agent processes execute on various host computer systems such as servers within the storage area network to manage storage area network entities (i.e., managed resources such as devices). As an example, there may be different respective agent programs specifically designed (e.g., coded) to remotely manage and control certain vendor-specific data storage systems, databases, switches, and so forth.

Agent processes receive remote management commands from the server process and apply functionality associated with those management commands to the managed resources within the storage area network for which those agents are designated to manage. Agents may receive a command, for example, to collect or discover configuration or management data concerning the network resources that those agents manage. This device discovery data collection process can happen in a scheduled or periodic manner, or in response to a command received from the management server. When agents are finished processing a command, results are returned to the store process for storage within a network management database. The server can then access the database to view the results of the command sent to the agent process.

If even a single resource in a SAN such as a switch, operating system, host bus adapter, storage system, or the like is incompatible with other hardware and/or software resources present in the storage area network, then the storage area network may no longer operate properly and enable a respective user to retrieve stored data.

One conventional way to ensure that a storage area network will work properly (e.g., so that the storage area network enables users to access corresponding stored data) is to provide a software application that operates as a SAN resource compatibility checker. Such applications are referred to herein as SAN advisor or network compatibility checking software applications since they can analyze a given SAN configuration and can indicate or "advise" a user (e.g. a SAN administrator) of what resources in the SAN might present compatibility problems with other resources in a particular SAN configuration.

SUMMARY

Conventional applications that support management of a storage area network environment and/or SAN resource compatibility checking for a given SAN configuration suffer from a variety of deficiencies. For example, as discussed above, management of a storage area network can be a challenge due to the complex network of resources that must be combined so that the storage area network operates properly for a multitude of different types of users. Application of a set of rules to validate a storage area network configuration requires proper knowledge of the types (i.e., specific identities) of resources in the storage area network. Unfortunately, a storage area network can include so many different types (e.g., manufacturer, model, hardware settings, software settings, versions, product identities, etc.) of specific identities of resources that it is often difficult to identify all of such specific resource identity information (e.g., resource types, models, versions, etc.) and therefore render an assessment whether a respective storage area network configuration is acceptable.

During compatibility checking of a storage area network, the compatibility checking software is able to interface with storage area network management software to obtain component data from the network management software. The component data was originally collected by agents of the storage area network management software. Once obtained, the compatibility checking software must match the component data collected for each resource in the storage area network to a specific identity of that resource. By specific identity, what is meant is a particular identity of an instance of a resource as indicated in the component data. This specific resource identity may include a resource manufacturer name, resource model number, resource version, patch level (e.g. if an operating system) and possibly other information.

For example, if the component data for a certain portion of a storage area network indicates a resource is a storage area network switch with 16 ports, the compatibility checking software can match specific attributes of this switch, as expressed in the component data, such as the serial number, number of ports, and so forth to a particular vendor and switch model number. One reason specific identities of resources must be obtain to this detailed level (rather than just using the fact that the resource is a 16 port switch) is because the compatibility checking software is also equipped with a compatibility database that indicates compatibility issues between specific resource identities. As an example, the compatibility database may indicate that a particular vendor or manufacturer's storage area network switch having model number XYZ and firmware version ABC is not compatible in a storage area network with a certain other vendor's host bus adapter cards having model number 123 and firmware version 456. There may be many such incompatibilities within the compatibility database, but each is indicated using very specific resource identities, rather than the general resource identities as presented in different data formats within component data collected by a storage area network management application. Accordingly, for the compatibility checking software to perform compatibility checking using the compatibility database, all resources that are generally identified in differing data formats with the component data must first be mapped to specific resource identities that particularly identify specific instances of resource in a quite detailed manner.

To do this matching, the compatibility checking software is further equipped with a resource identity database that contains matches of specific identities of resources in conjunction with component data that would typically be collected from one of such resources (e.g. by an agent in a storage area network management application) if that resource were operating in a storage area network. Using this resource identity database, prior to doing compatibility checking of a given storage area network configuration, all component data in that storage area network configuration is attempted to be mapped or matched to specific resource identities. Certain compatibility checking software provides an automated matching or mapping technique to automate the process of mapping generic or general resource identities as expressed in component data to specific resource identities. One such algorithm is explained in co-pending U.S. patent application entitled "RESOURCE MAPPING IN A NETWORK ENVIRONMENT", Ser. No. 11/640,599, that shares co-inventorship and the same assignee as the present application. The entire contents of this application are hereby incorporate by reference in its entirety.

Using the switch again as an example, to perform compatibility checking, it is not enough to simply use the general or non-uniform component data formatted identity of that switch, but rather, what must be used is an actual specific identity of that switch resource as expressed in the component data. To get this identity, the automated matching or mapping technique tries to determine this specific resource identity for every resource that is present in the component data. However, in some cases, the component data (e.g., collected data) received from a respective storage area network resource does not always include enough information to map the respective storage area network resource to a corresponding known type of storage area network resource with sufficient certainty to be able to identify a single specific resource identity. In addition to not including enough information to aid in mapping the resource to a specific identity, the collection of data received from the storage area network resource may include extraneous data that is not useful for mapping purposes.

Embodiments disclosed herein provide a system, methods and apparatus that enables a user who is operating the compatibility checking software to provide manual or human assisted mappings of component data to specific storage area network resource identities. For a user who creates one or more manual or user-created mappings, the system disclosed herein can maintain a user map history of all prior mapping made in this manner by the user. Accordingly, when the user later uses the compatibility checking software to perform compatibility checking on a given storage area network configuration, former manual or user-created mapping made a priori (i.e. during former compatibility checking of the same, or of a different storage area network configuration at an earlier time) by that user can be consulted during the automated matching algorithm to assist in mapping component data to specific resource identities.

More specifically, the system disclosed herein in one configuration provides a user map service that is accessible by a compatibility checking software application. The user map service operates to allow a user such as the network administrator (or other user of the compatibility checking software application) to perform a manual or human "thought-based" or manual mapping of component data to a specific resource identity. Generally, when the compatibility checking software application encounters component data that it cannot match in an automated manner, the compatibility checking software application can invoke the user map service in an attempt to have the user map this data. The user map service displays this unmapped component data to the user (either in a raw, or in a filtered or "cleaned-up" manner, within a graphical user interface) and can present a list of possible specific identities to which that unknown component data may match. The user, using his or her professional knowledge of storage area network resources, can then create, choose or otherwise specify a manual mapping or match between the unknown component data (that could not be automatically matched) to a specific resource identity, to thus map or match the unknown component data to that of a specific instance of a resource. The user map service saves or stores the newly formed association, that the user creates, between the component data and a specific identity of a resource (e.g. a manufacturer and product identity that corresponds to the component data) within a user-created component matching database for future reference. In the event that the same component data is again encountered (e.g. either from another resource in the storage area network, or during another operation of compatibility checking), the compatibility checking software application can use the user map service to identify the specific identity of the resource since the former association between that component data and a specific identity of a resource is saved in the user-created component matching database. In this manner, the system disclosed herein allows users to provide specific mappings between agent collected component data and resource identities and is able to stored these mapping and use them for future automated mapping of component data to resource identities.

In one embodiment, the compatibility checking software may apply a mapping function to the component data to modify the collected component data to remove extraneous data that is not particularly useful for mapping purposes. For example, the mapping function can receive a character string of component data originated by the resource. Such collected data can include at least a portion of data reflecting a classification or identification of the resource as well as other data that does not provide any indication of the resource's specific identity. In one embodiment, the mapping function modifies the component data (e.g., one or more character strings of information) by removing at least a portion of data from the received data to produce a filtered set of data that the user map service can then present to the user. In other words, prior to invoking the user map service, or within the user map service but prior to presenting the component data to the user for creation of a user-created mapping, the mapping function can remove specific portions of component data received from the resource to eliminate extraneous portions of data that are not useful for mapping purposes and that may confuse the user. In one example configuration then, the user map service uses the filtered set of component data (e.g., modified set of collected data) during creation of the user-created mapping of the component data to a specific identity of the resource.

Yet other embodiments of the present disclosure include software programs to perform the method embodiment and operations summarized above and disclosed in detail below in the Detailed Description section of this disclosure. More specifically, one embodiment herein includes a computer suter program product (e.g., a computer-readable medium). The computer program product includes computer program logic (e.g., software instructions) encoded thereon. Such computer instructions can be executed on a computerized device to support mapping according to embodiments herein. For example, the computer program logic, when executed on at least one processor associated with a computing system, causes the processor to perform the operations (e.g., the methods) indicated herein as embodiments of the present disclosure. Such arrangements as further disclosed herein are typically provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

Yet another more particular technique of the present disclosure is directed to a computer program product that includes a computer readable medium having instructions stored thereon for executing mapping functions according to embodiments herein. The instructions, when carried out by a processor of a respective computer device, cause the processor to perform the steps and processing disclosed here for the user map service. Other embodiments of the present application include software programs to perform any of the method embodiment steps and operations summarized above and disclosed in detail below.

It is to be understood that the system of the present application can be embodied solely as a software program, or as a software program operating in conjunction with corresponding hardware. For example, embodiments of the present application may be implemented in EMC's Control Center (ECC) software application that provides graphical management and advisory functionality of storage area network resources. Embodiments of the present application may also be implemented in computer devices that operate in connection with the Control Center (ECC) software. Control Center software is manufactured by EMC Corporation of Hopkinton, Mass., USA.

As discussed above, techniques herein are well suited for use in mapping and/or classifying resources in a respective storage area network environment. However, it should be noted that embodiments herein are not limited to use in such applications and that the techniques discussed herein are well suited for other applications as well. Note that each of the different features, techniques, configurations, etc. discussed herein can be executed independently or in combination. Accordingly, the present invention can be embodied and viewed in many different ways. The user map service can be a standalone service, a web service, or can be tightly integrated into a compatibility checking software application.

Also, note that this summary does not specify every embodiment and/or incrementally novel aspect of the present disclosure or claimed invention. Instead, this summary only provides a preliminary discussion of different embodiments and corresponding features of the system disclosed herein. For additional details and/or possible perspectives (permutations) of the invention, the reader is directed to the Detailed Description section and corresponding figures of the present disclosure.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Figure 1:
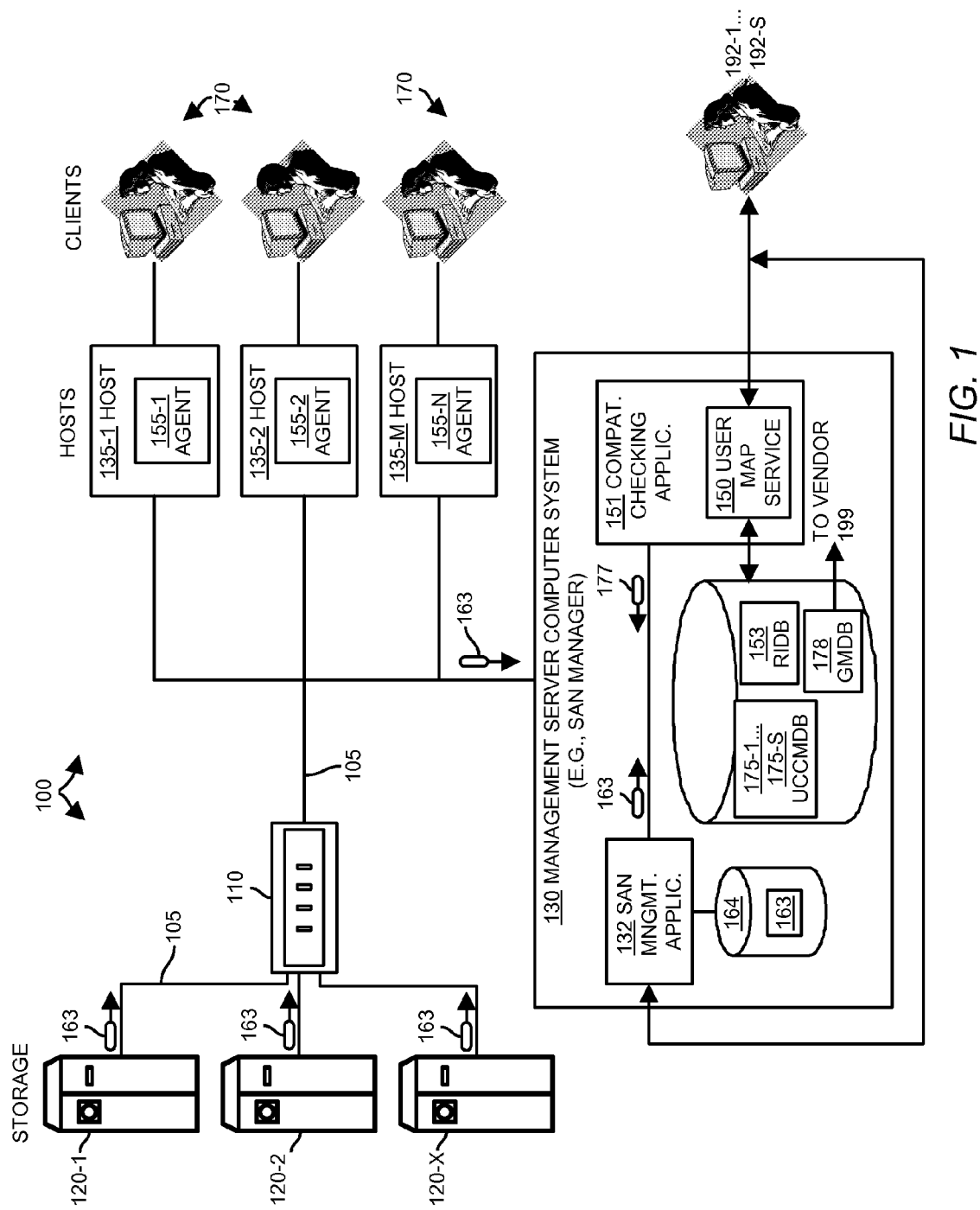
FIG. 1 illustrates an example storage area network environment that includes a compatibility checking software application including a user map service configured according to embodiments disclosed herein.

FIG. 1 illustrates an example of a networking environment suitable for use in explaining example embodiments of the invention. In this example, the networking environment is a storage area network 100 that includes a communications medium 105 that interconnects a plurality of components such as data storage systems 120-1 through 120-X, one or more connectivity devices 110 (e.g., storage area network switches), and a plurality of host computer systems 135-1 through 135-M (e.g., servers) that serve data to client computer systems 170 (e.g. end user computer systems). Generally components or resources of the storage area network 100 include the data storage systems 120, hosts 135 and connectivity devices 110, as well as various resources within each of these devices, such as operating systems and communications ports within hosts 135, communications ports within switches 110, and adapters and ports within the data storage systems 120.

This example storage area network 100 includes a management server computer system 130 that operates a management application 132 (i.e., a SAN management software application) that manages resources such as the hosts 135, connectivity devices 110 and storage systems 120 within the storage area network 100. A plurality of agent software processes 155-1 through 155-M operate within one or more of the host computer systems 135-1 through 135-M. Generally, the agents 155 interoperate with, and are collectively considered parts of the storage area network management application 132. The agents 155 are configured to periodically collect component data 163 from the various manageable resources that operate in the storage area network 100 and are further operable to provide this component data 163 for storage within a management database 164 maintained by the storage area network management application 132. A network administrator 192 interacts with the management application 132 executing on the management server computer system 130 in order to remotely administer manageable resources within the storage area network 100. Manageable resources include, for example, data storage systems 120, the connectivity devices 110 and the host computer systems 135 (or devise or software that operate within these resources) and/or many other types of hardware or software entities within the storage area network 100. The management database 164 thus contains a "snapshot" of component data 163 collected by agents 155 for all manageable resources (e.g. hosts 135 and managed host resources such as operating system, etc., switches 110 and managed switch resources such as ports, etc., and storage systems 120 and managed storage resources such as ports, devices and so forth) within the storage area network 100. An example of the storage area network management application 132 is EMC's Control Center product manufactured by EMC Corporation of Hopkinton, Mass., U.S.A.

Over time, the network administrator 192 may make changes to the storage area network 100. For example, the network administrator 192 may add or replace resources such as hosts 135, switches 110 or storage 120 in the storage area network 100. Alternatively, the network administrator 192 may upgrade software or peripherals within the resources, may install patches, update firmware, or may make other changes to resources within the storage area network 100. The management server computer system 130 operates a compatibility checking software application 151 that operates to check the compatibility of resources operating in the storage area network 100 to indicate or advise the administrator 192 of compatibility problems that might arise with a particular storage area network configuration. To perform such compatibility checking of resources in the storage area network 100, the compatibility checking software application 151 is able to access the management database 164 of the management application 132 to obtain component data 163 for each resource that operates in the storage area network 100. The component data 163 may be in a variety of formats when discovered by the agents 155 when those agents 155 communicate with each resource. As an example, when a host agent 155 periodically (e.g. nightly) queries a particular host 135 to obtain component data 163 that indicates what version of an operating system is executing on that host 135, depending on the operating system, the component data 163 may vary. The component data 163 may be an alphanumeric string indicating an operating system vendor (e.g. manufacturer), version, installed patch level, model, and other related information or data. The compatibility checking software application 151 is configured with a resource identity database 153 that enables the matching (i.e. mapping) of component data 163 to specific identities of resources. Entries in the resource identity database 153 are initially defined from the vendor of the compatibility checking software application 151. As an example, an entry in the resource identity database 153 may indicate that for a known string of component data 163 collected from a resource such as an operating system executing in a host computer system 135, the strong of component data matches a specific operating system manufacturer, version and patch level. There can be many hundreds or thousands of such mapping entries within the resource identity database 153, and each entry operates to match specific component data to a specific resource identity. One purpose of this matching process is that in order to perform precise compatibility checking of resources that interoperate within the storage area network 100, the compatibility checking software application 151 must be able to clearly and precisely identify those resources based on the component data 163 collected by the agents 155. The specific identities of resources produced during this mapping operation can include the vendor of the resource, a model, part or version number, a patch level, and other such detailed information. A particular systems and process for automated mapping of component data 163 to specific identities of resources is explained in detail the aforementioned co-pending U.S. patent application entitled "RESOURCE MAPPING IN A NETWORK ENVIRONMENT".

In some instances, an automated process of matching component data 163 to specific resource identities does not always work properly. This may happen, for example, in situations a resource in a storage area network that is queried by an agent 155 is not configured to properly return standard or default component data values or strings. In such cases, the component data 163 collected by an agent 155 may not exactly match a specific resource identity within the resource identity database 153. Embodiments disclosed herein allow the compatibility checking software application 151 to use a user map service 150 as disclosed herein to allow a user such as the network administrator 192 (or other user of the compatibility checking software application 151) to perform a manual or human thought based mapping of component data 163 to a specific resource identity. Generally, when the compatibility checking software application 151 encounters component data 163 that it cannot match in an automated manner, the compatibility checking software application 151 can display this component data 163 to the user (in a raw, or in a filtered or "cleaned-up" manner, within a graphical user interface) and can present a list of possible specific identities to which that unknown component data 163 may match. The user 192, using his or her knowledge of storage area network resources, can then create, choose or otherwise specify a manual mapping or match between the unknown component data (that could not be automatically matched) to a specific resource identity, to thus convert, map or match the unknown component data 163 into now-identified component data. The user map service 150 saves or stores the newly formed association, that the user 192 creates, between the component data 163 and a specific identity of a resource (e.g. a manufacturer and product identity that corresponds to the component data 163) within a user-created component matching database 175 for future reference. In the event that the same component data 163 is again encountered (e.g. either from another resource in the storage area network, or during another operation of compatibility checking), the compatibility checking software application 151 can use the user map service 150 to identify the specific identity of the resource since the former association between that component data 163 and a specific identity of a resource is saved in the user-created component matching database 175. In this manner, the system disclosed herein allows users to provide specific mappings between agent collected component data 163 and resource identities and is able to stored these mapping and use them for future automated mapping of component data to resource identities.

Depending upon the configuration, there may be separate user-created component matching databases 175-1 through 175-S for different users 192-1 through 192-S. In other configurations, the user map service 150 allows matching data from multiple user-created component matching databases 175-1 through 175-S to be combined or used for automated matching, regardless of the user 192 operating the compatibility checking software 151. Further details of operation of the user map service 150 as configured within compatibility checking software 151 will now be explained with respect to flow charts of processing steps that illustrate such details.

Figure 2:
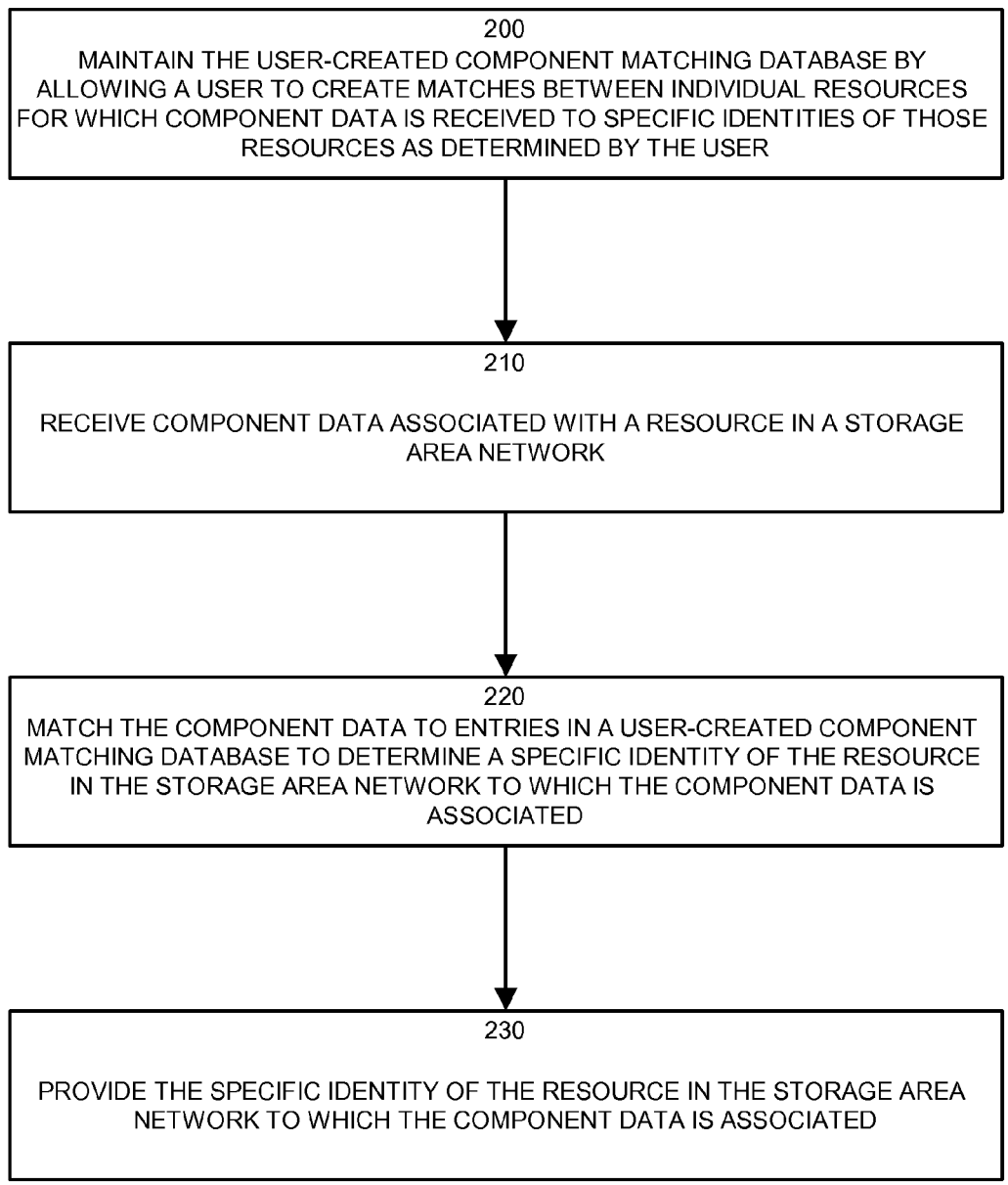
FIG. 2 is a flowchart illustrating high-level processing of user mapping of resources according to embodiments herein.

FIG. 2 is a flow chart of high-level processing steps that a compatibility checking software application 151 equipped with a user map service 150 performs to maintain and utilize a user-created component matching database 175.

In step 200, the user map service 150 maintains the user-created component matching database 175 by allowing a user 192 to create matches between individual resources, for which component data 163 is received, to specific identities of those resources as determined by the user 192. Details of creation of the user-created component matching database 175 will be explained more fully later. For purposes of this high-level description, it is sufficient to understand that the user map service 150 is able to present component data 163 (that was unable to be matched automatically) to a user 192 (e.g. via a graphical user interface) and allows that user to indicate (e.g. via selection from a list, or by typing in) a specific resource identity that is to correspond with or be associated to that component data 163. This mapping association is stored in the user-created component matching database 175. Steps 210 through 230 below show processing that utilizes this database in an automated matching process.

In step 210, the user map service 150 receives component data 163 associated with a resource in a storage area network. The user map service 150 may be a software class, routine, function, program or other executing process that exposes a function or method call allowing a requester (the compatibility checking software 151 in this example) to provide the component data 163, for example, as an argument to a method call in the form of a string of character data.

In step 220, the user map service 150 matches the component data 163 to entries in the user-created component matching database 175 to determine a specific identity of the resource in the storage area network to which the component data 163 is associated.

In step 230, the user map service 150 provides the specific identity 177 of the resource in the storage area network 100 to which the component data 163 is associated. This specific identity 177 can be, for example, returned as an argument in response to the function or method call made in step 210.

In this manner, the user map service 150 provides the operations of receiving component data, matching the component data and providing the specific identity of the resource as a user map history service 150 within a storage area network compatibility checking software application 151. In one configuration, the compatibility checking software application 151 maintains a respective user-created component matching database for each respective user 192 that uses the compatibility checking software application. In this manner, as a particular user makes more and more mappings that associated component data to specific resource identities, the user map service 150 allows that user to continuously update content of the user-created component matching database 175 that is specific to that user 192.

FIGS. 3 through 6 are a flow chart showing more detailed processing of the high level processing operations outlined above.

Figure 3:
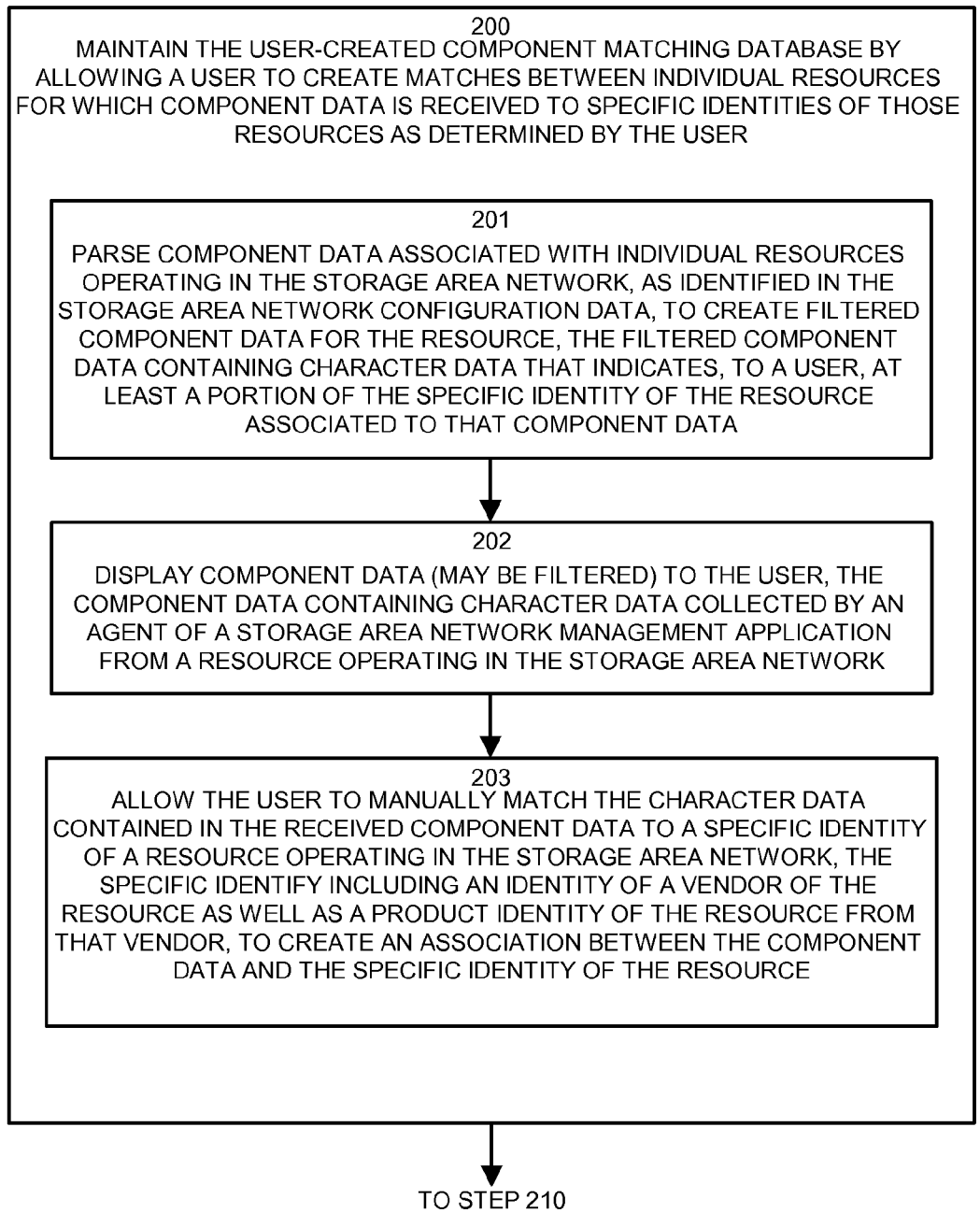
FIGS. 3 through 6 are a flow chart of detailed processing steps to perform creation of user maps and to perform mapping using the user map service as disclosed herein.

In FIG. 3 at step 200, the user map service 150 maintains the user-created component matching database by allowing a user 192 to create matches between individual resources for which component data 163 is received to specific identities of those resources as determined by the user.

In step 201, the user map service 150 parses component data 163 associated with individual resources operating in the storage area network, as identified in the storage area network configuration data (e.g. the management database 164), to create filtered component data for the resource. The component data 163 as obtained by an agent 155 may contain extraneous data that does not help to identity a particular product, version or the like. By removing this information, the user map service 150 provides only component data relevant to identifying a specific product. The filtered component data contains character data that indicates, to a user, at least a portion of the specific identity of the resource to be associated to that component data.

In one embodiment, the compatibility checking software may apply a filter function to the component data to modify the collected component data to remove extraneous data that is not particularly useful for mapping purposes. For example, the mapping function can receive a character string of component data originated by the resource. Such collected data can include at least a portion of data reflecting a classification or identification of the resource as well as other data that does not provide any indication of the resource's specific identity. In one embodiment, the filter function modifies the component data 163 (e.g., one or more character strings of information) by removing at least a portion of data from the received data to produce a filtered set of data that the user map service can then present to the user. In other words, prior to invoking the user map service 150, or within the user map service but prior to presenting the component data to the user 192 for creation of a user-created mapping, the filter function can remove specific portions of component data received from the resource to eliminate extraneous portions of data that are not useful for mapping purposes and that may confuse the user. In one example configuration then, the user map service 150 uses the filtered set of component data (e.g., modified set of collected data) during creation of the user-created mapping of the component data to a specific identity of the resource.

In step 202, the user map service 150 displays unmapped component data 163 to the user. This may be done via a graphical user interface for example. The component data 163 contains character data (e.g. a string) collected by an agent 155 of a storage area network management application 132 from a resource such as a host 135, switch 110 or storage system 120 operating in the storage area network. As noted in step 201, this data may be filtered.

In step 203, the user map service 150 allows the user to manually match the character data contained in the received component data 163 to a specific identity of a resource operating in the storage area network. The specific identity includes, for example, an identity of a vendor of the resource as well as a product identity of the resource from that vendor. This matching is a user-created association between the component data and the specific identity of the resource. Details of step 203 are shown in the flow chart in FIG. 4 in steps 204 through 209 that shows details of one example embodiment that allows user creation and storing of such associations.

Figure 4:
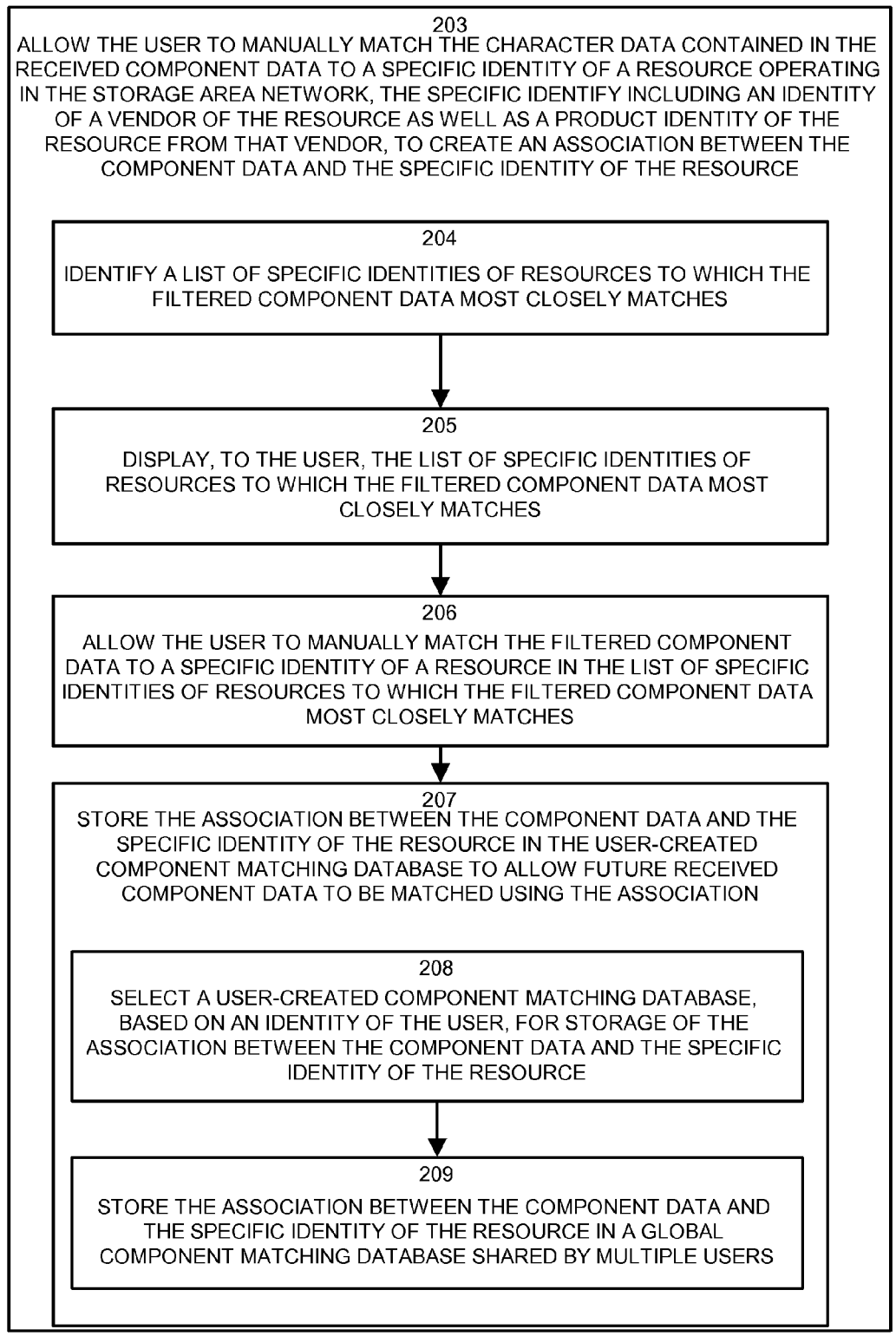

In FIG. 4 at step 204, the user map service 150 identifies a list of specific identities of resources to which the filtered component data most closely matches. In this configuration, the compatibility checking application 151 may be able to narrow down a potential list of specific resource identities based on automated matching of the component data 163, but may not be able to limit the selection to a single specific identity. In this step then, the list of possible identities can be used to help the user quickly identify a single specific product identity.

In step 205, the user map service 150 displays, to the user (e.g. via a graphical user interface list, pull down menu, or other display technique), the list of specific identities of resources to which the filtered component data most closely matches.

In step 206, the user map service 150 allows the user to manually match the filtered component data to a specific identity of a resource in the list of specific identities of resources to which the filtered component data most closely matches.

In step 207, the user map service 150 stores the association between the component data 163 and the specific identity of the resource in the user-created component matching database to allow future received component data to be matched using the association. Steps 208 and 209 show details of this processing.

In step 208, the user map service 150 selects a user-created component matching database 175, based on an identity of the user, for storage of the association between the component data and the specific identity of the resource. In this manner, each the user map service can maintain a distinct database for manual matches made by that user. In an alternative configuration, individual user-create component matching database 175 can be combined into a global database as shown in step 209.

In step 209, the user map service 150 stores the association between the component data 163 and the specific identity of the resource in a global component matching database 178. This database can be shared by multiple users 192-1 through 192-S.

In one configuration, the user map service 150 operates to build a global database 178 on a per user basis. In other words, each user 192 has a respective user-created component matching database 175 (that contains all manually created matches), as well as a global map history database 178 that contains both user-created matches as well as automated matches. In such a configuration, the difference between the two databases 175 and 178 is that the user-created component matching database 175 contains manual or user-created mappings only, while the latter global database 178 contains both manually user-created matches as well as matches created via an automated matching algorithm such as that described in the formerly referenced co-pending patent application. In such a configuration, the users 192 is able to send the global matching database 178 to a central collection facility shown as the vendor 199 for merging into a master matching database maintained by a vendor of the compatibility checking software 151. The user map service 150 can compose the global database 178 whenever the user 192 requests to send this information to the vendor 199 of the compatibility checking software 151. At the vendor site, the vendor can receive the users global database 178 and can process this for general matching trends (e.g. common to other users), and if a particular portion of component data 163 is found to have been matched to the same specific resource identity 177 for many users, the vendor 199 can incorporate this match into a future version of the resource identity database 153 as supplied with a future release (or upgrade) of the compatibility checking software 151, or within a new version of the resource identity database 153 that users 192 can download from the vendor 199. In this manner, user created matches can be collected and used to enhance the resource identity database 153. By having the user map service forward the global component matching database 178 to a vendor 199 of the compatibility checking software 151, this allows the vendor to integrate user-created matches with user-created matches of other users into a resource identity database 153 used by the compatibility checking software 151.

Returning to the discussion of processing shown in the flow chart, once the user-created component matching database 175 is created, as the compatibility checking application 151 performs its matching algorithm, the user map service is queried with component data to determine if a user has formerly created an association of that component data 163 to a specific resource identity. Thus, typical entry into the processing of the user map service 150 from the compatibility checking application 151 is to pass component data 163 to a method call that begin processing as step 210. Steps 210 through 231 in FIG. 5 thus show details of processing for newly received component data 163 for which a specific resource identity is required.

Figure 5:
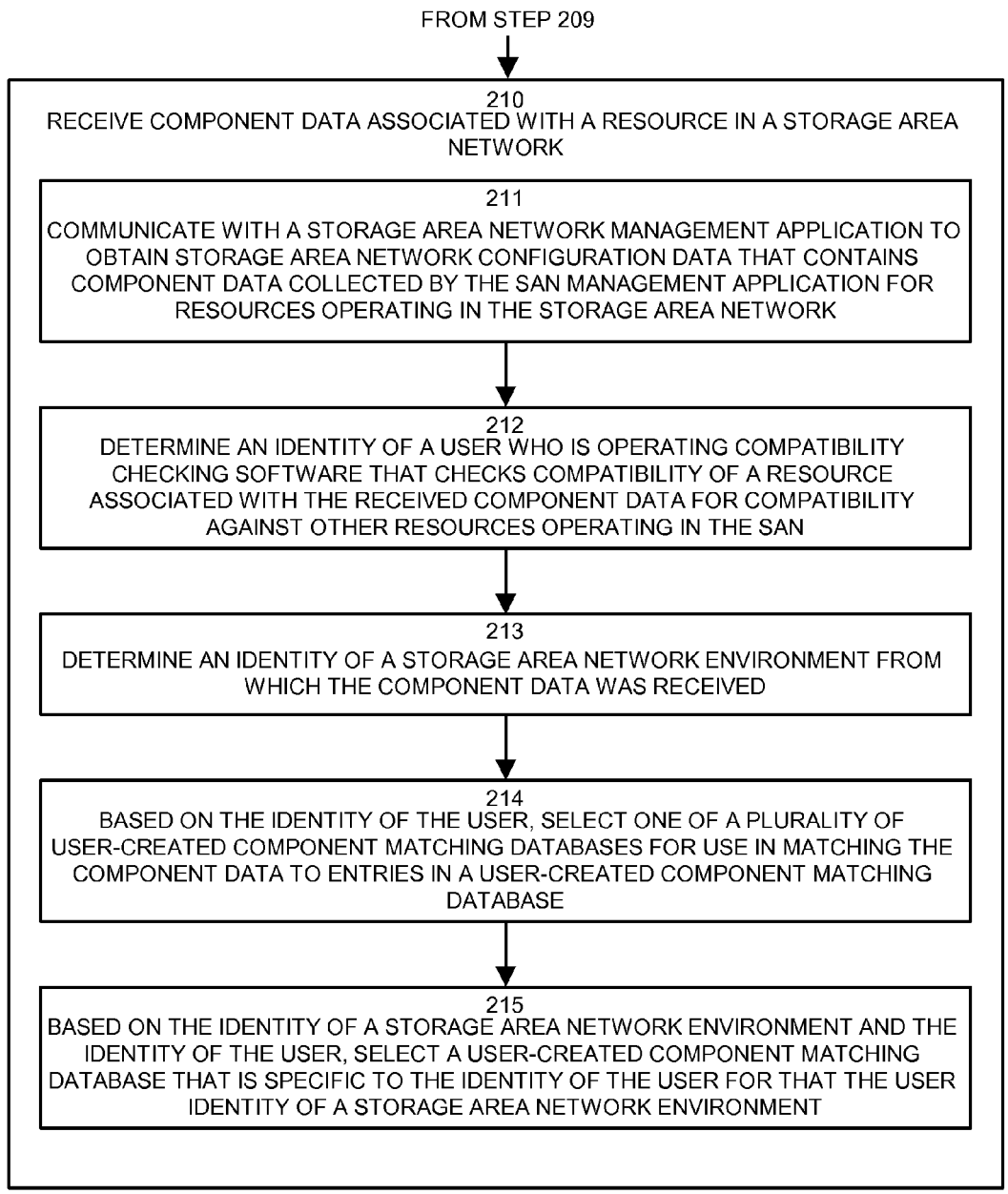

In FIG. 5 in step 210, the user map service 150 receives component data 163 associated with a resource in a storage area network. Step 211 shows details of step 210 in one example configuration.

In step 211, the user map service 150 communicates with a storage area network management application 132 to obtain storage area network configuration data (e.g. management database data 164) that contains component data 163 collected by the storage area network management application for resources operating in the storage area network 100.

In step 212, the user map service 150 determines an identity of a user 192 who is operating compatibility checking software 151 that checks compatibility of a resource associated with the received component data 163 for compatibility against other resources operating in the storage area network 100. By determining the user identity, a specific user-created component matching database 175 can be selected.

In step 213, operationally, the user map service 150 also determines an identity of a storage area network environment 100 from which the component data was received. Once configuration of the system disclosed herein is able to maintain separate user-created component matching databases 175 for each user 192 for each storage area network 100 managed by that user. Thus, is a user 192 is responsible for managing several different storage area network (e.g. such as virtual storage area networks), the system can maintain, if required or desired by that user, separate user matching database for each different storage area network 100.

In step 214, based on the identity of the user 192, the user map service 150 selects one of a plurality of user-created component matching databases 175-1 through 175-S for use in matching the component data 163 to entries in the selected user-created component matching database 175. The user map service 150 can contain a class responsible for managing user identities associated to specific user-created component matching database 175. Note if a user-created component matching database 175 does not yet exist for a user, a new user-created component matching database 175 can be created and saved for this user 192.

In step 215, if a storage area network identity is also used, based on the identity of a storage area network environment and the identity of the user, the user map service 150 selects a user-created component matching database 175 that is specific to the identity of the user 192 for that the user identity of a storage area network environment.

Figure 6:
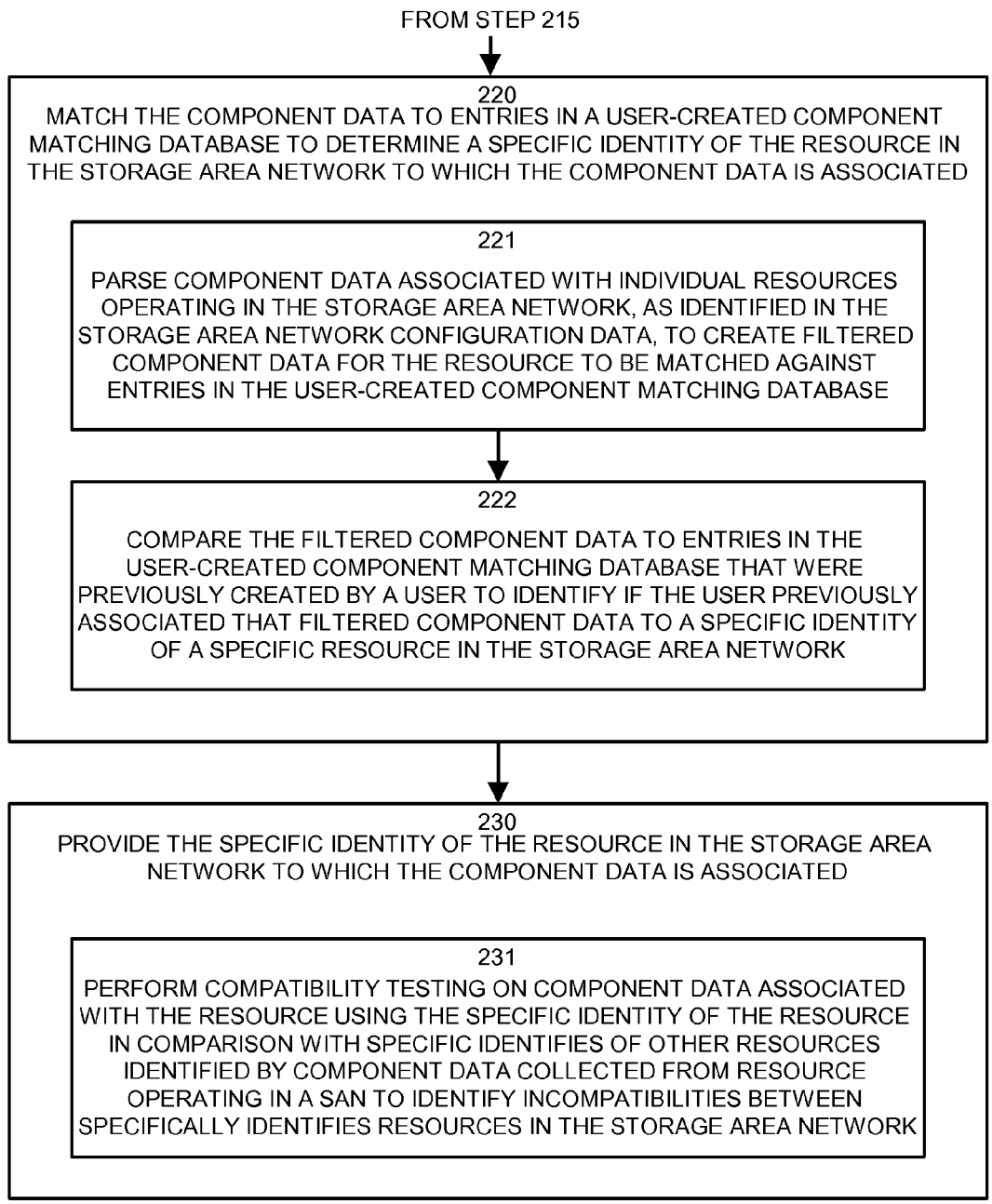

In FIG. 6 in step 220, the user map service 150 matches the component data to entries in the selected user-created component matching database 175 to determine a specific identity of the resource in the storage area network 100 to which the component data is associated. Steps 221 and 222 show details of this processing in one example configuration.

In step 221, the user map service 150 parses component data associated with individual resources operating in the storage area network, as identified in the storage area network configuration data (i.e. as contained in the management database 164), to create filtered component data for the resource to be matched against entries in the user-created component matching database. In this step, parsing involves "cleaning up" the component data 163 to remove characters that are not relevant to the matching process. Depending upon the data format of the component data 163, this can involve, for example, removing white space (e.g. tabs, spaces, etc.) and other characters that would not typically occur in a specific resource identity.

In step 222, the user map service 150 compares the filtered component data to entries in the user-created component matching database 175 that were previously created by a user (e.g. in steps 200 through 209 above) to identify if the user previously associated that filtered component data 163 to a specific identity of a specific resource in the storage area network.

In step 230, assuming a match is found, the user map service 150 provides the specific identity of the resource in the storage area network to which the component data is associated. If a match is not found, processing can proceed to step 200 to allow the user to establish a new association of that unknown component data 163 to a user defined or selected specific resource identity. This new association is then stored in the database 175 as explained above. When the user map service 150 returns the specific resource identity, the compatibility checking application 151 can proceed with compatibility check of this resource as shown in step 231.

In step 231, the user map service 150 performs compatibility testing on component data 163 associated with the resource by using the specific identity of the resource (as provided by the user map service 150) in comparison with specific identifies of other resources identified by component data 163 collected from other resources operating in the storage area network to identify incompatibilities between specifically identified resources in the storage area network 100. In this manner, the user map service enables users to create manual or human-decided mappings of component data to specific resource identities.

The user map service 150 thus allows the user-created component matching database(s) 175 to grow as user match more and more component data to resource identities. Over time, the auto matching algorithm will require less and less user intervention to create manual matches since the user will have populated his or her database with matches that will help automate the matching process. The user map service 150 thus creates the database 175, and during operation is able to cache its contents. The service 150 also allows the contents to be updated with new user matches, and provides the ability to query the cached database 175, and makes sure the cache is written back to the database 175 after being updated.

It is to be understood that the user map service and a compatibility checking software operating in a computer system is considered an embodiment of the invention. Such a computer system can be a general purpose or dedicated computer system and can include a processor such as a microprocessor and a memory unit such as random access memory that stores instructions such as software code associated with a compatibility checking software application. The processor and memory are coupled via an interconnect such as motherboard or other circuitry. The instructions can be executed by the processor to carry out the aforementioned processing. As discussed above, techniques herein are well suited for use in environments supporting automated mapping of resources. As discussed above, one such application for applying these techniques is a storage area network environment 100. However, it should be noted that application of the techniques herein is not limited to use in such applications.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present application. As such, the foregoing description of embodiments of the present application is not intended to be limiting. Rather, any limitations to the invention are presented in the following claims.

What is claimed is:

1. A method to identify a resource in a network, the method comprising:
    receiving component data associated with a resource in a storage area network, receiving the component data further including:
        communicating with a storage area network (SAN) management application to obtain storage area network configuration data that contains component data collected by the SAN management application for resources operating in the storage area network;
    matching the component data to entries in a user-created component matching database to determine a specific identity of the resource in the storage area network to which the component data is associated, matching the component data to entries in a user-created component matching database further comprising:
        parsing component data associated with individual resources operating in the storage area network, as identified in the storage area network configuration data, to create filtered component data for the resource to be matched against entries in the user-created component matching database; and
        comparing the filtered component data to entries in the user-created component matching database that were previously created by a user to identify if the user previously associated that filtered component data to a specific identity of a specific resource in the storage area network;
    providing the specific identity of the resource in the storage area network to which the component data is associated; and
    maintaining the user-created component matching database by allowing a user to create matches between individual resources for which component data is received to specific identities of those resources as determined by the user, matching further comprising:
        determining when an automated match cannot be made from the comparing;
        presenting a set of possible specific identities based on a portion of the component data based on previously associated component data and resources;
        receiving a mapping of the component data to the specific identity of the resource to identify an association; and
        storing, in the user-created component matching database, the identified association for future matching of resources to specific identities using the mapped component data.

2. The method of claim 1 comprising:
    determining an identity of a user who is operating compatibility checking software that checks compatibility of a resource associated with the received component data for compatibility against other resources operating in the san; and based on the identity of the user, selecting one of a plurality of user-created component matching databases for use in matching the component data to entries in a user-created component matching database.

3. The method of claim 2 wherein, based on the identity of the user, selecting one of a plurality of user-created component matching databases comprises:
   determining an identity of a storage area network environment from which the component data was received; and
   based on the identity of a storage area network environment and the identity of the user, selecting a user-created component matching database that is specific to the identity of the user for that the user identity of a storage area network environment.

4. The method of claim 1 wherein maintaining the user-created component matching database comprises:
   displaying received component data to the user, the received component data containing character data collected by an agent of a storage area network management application from a resource operating in the storage area network;
   allowing the user to manually match the character data contained in the received component data to a specific identity of a resource operating in the storage area network, the specific identify including an identity of a vendor of the resource as well as a product identity of the resource from that vendor, to create an association between the component data and the specific identity of the resource; and
   storing the association between the component data and the specific identity of the resource in the user-created component matching database to allow future received component data to be matched using the association.

5. The method of claim 4 wherein displaying received component data to the user comprises:
   parsing component data associated with individual resources operating in the storage area network, as identified in the storage area network configuration data, to create filtered component data for the resource, the filtered component data containing character data that indicates, to a user, at least a portion of the specific identity of the resource associated to that component data.

6. The method of claim 4 wherein allowing the user to manually match the character data contained in the received component data to a specific identity of a resource operating in the storage area network comprises:
   identifying a list of specific identities of resources to which the filtered component data most closely matches;
   displaying, to the user, the list of specific identities of resources to which the filtered component data most closely matches; and
   allowing the user to manually match the filtered component data to a specific identity of a resource in the list of specific identities of resources to which the filtered component data most closely matches.

7. The method of claim 4 wherein storing the association between the component data and the specific identity of the resource in the user-created component matching database comprises:
   storing the association between the component data and the specific identity of the resource in a global component matching database;
   forwarding the global component matching database to a vendor of the compatibility checking software to allow the vendor to integrate user-created matches with user-created matches of other users into a resource identity database used by the compatibility checking software.

8. The method of claim 1 wherein providing the specific identity of the resource in the storage area network to which the component data is associated comprises:
   performing compatibility testing on component data associated with the resource using the specific identity of the resource in comparison with specific identifies of other resources identified by component data collected from resource operating in a san to identify incompatibilities between specifically identifies resources in the storage area network.

9. The method of claim 1 wherein the filtered data is filtered from the received component data for removal of extraneous data, and includes component data indicative of the specific identity, and omits data not reflective of the specific identity, such that the specific identity receivable by a compatibility database, the compatibility database being a multi-vendor reference indicative of incompatibilities between specific identities of resources.

10. The method of claim 9 wherein the component data includes a character string of component data originated by the resource and indicative of the specific identity of the resource, the resource being one of a switch, host or storage array,
   the specific identity including at least a vendor, model number and firmware number.

11. The method of claim 1 wherein the specific identity defines a manufacturer, product and model number and matching the resource to the user created component matching database and to the resource identity database includes comparing character data indicative of attributes of the resource.

12. A computer system comprising:
   a processor;
   a memory unit that stores instructions associated with an application executed by the processor; and
   an interconnect coupling the processor and the memory unit, enabling the computer system to execute the application and perform operations of:
   receiving component data associated with a resource in a storage area network, receiving the component data further including:
      communicating with a storage area network (SAN) management application to obtain storage area network configuration data that contains component data collected by the SAN management application for resources operating in the storage area network;
   matching the component data to entries in a user-created component matching database to determine a specific identity of the resource in the storage area network to which the component data is associated, matching the component data to entries in a user-created component matching database further comprising:
      parsing component data associated with individual resources operating in the storage area network, as identified in the storage area network configuration data, to create filtered component data for the resource to be matched against entries in the user-created component matching database; and
      comparing the filtered component data to entries in the user-created component matching database that were previously created by a user to identify if the user previously associated that filtered component data to a specific identity of a specific resource in the storage area network;

providing the specific identity of the resource in the storage area network to which the component data is associated: and maintaining the user-created component matching database by allowing a user to create matches between individual resources for which component data is received to specific identities of those resources as determined by the user, matching further comprising:

determining when an automated match cannot be made from the comparing;

presenting a set of possible specific identities based on a portion of the component data based on previously associated component data and resources;

receiving a mapping of the component data to the specific identity of the resource to identify an association; and storing, in the user-created component matching database, the identified association for future matching of resources to specific identities using the mapped component data.

13. The computer system of claim 12 comprising:

determining an identity of a user who is operating compatibility checking software that checks compatibility of a resource associated with the received component data for compatibility against other resources operating in the san; and based on the identity of the user, selecting one of a plurality of user-created component matching databases for use in matching the component data to entries in a user-created component matching database; and wherein, based on the identity of the user, selecting one of a plurality of user-created component matching databases comprises:

determining an identity of a storage area network environment from which the component data was received; and based on the identity of a storage area network environment and the identity of the user, selecting a user-created component matching database that is specific to the identity of the user for that the user identity of a storage area network environment.

14. The computer system of claim 12 comprising:

maintaining the user-created component matching database by allowing a user to create matches between individual resources for which component data is received to specific identities of those resources as determined by the user; and wherein maintaining the user-created component matching database comprises:

displaying received component data to the user, the received component data containing character data collected by an agent of a storage area network management application from a resource operating in the storage area network;

allowing the user to manually match the character data contained in the received component data to a specific identity of a resource operating in the storage area network, the specific identify including an identity of a vendor of the resource as well as a product identity of the resource from that vendor, to create an association between the component data and the specific identity of the resource; and storing the association between the component data and the specific identity of the resource in the user-created component matching database to allow future received component data to be matched using the association.

15. The computer system of claim 14 wherein allowing the user to manually match the character data contained in the received component data to a specific identity of a resource operating in the storage area network comprises:

identifying a list of specific identities of resources to which the filtered component data most closely matches;

displaying, to the user, the list of specific identities of resources to which the filtered component data most closely matches; and allowing the user to manually match the filtered component data to a specific identity of a resource in the list of specific identities of resources to which the filtered component data most closely matches; and wherein storing the association between the component data and the specific identity of the resource in the user-created component matching database comprises:

selecting a user-created component matching database, based on an identity of the user, for storage of the association between the component data and the specific identity of the resource.

* * * * *